United States Patent
Reigo et al.

(10) Patent No.: US 10,646,997 B2
(45) Date of Patent: *May 12, 2020

(54) NAVIGATION FOR A ROBOTIC WORKING TOOL

(71) Applicant: HUSQVARNA AB, Huskvarna (SE)

(72) Inventors: Peter Reigo, Djursholm (SE); Patrik Jägenstedt, Tenhult (SE); Magnus Öhrlund, Malmbäck (SE)

(73) Assignee: Husqvarna AB, Huskvarna (SE)

( * ) Notice: Subject to any disclaimer, the term of this patent is extended or adjusted under 35 U.S.C. 154(b) by 292 days.

This patent is subject to a terminal disclaimer.

(21) Appl. No.: 15/407,576

(22) Filed: Jan. 17, 2017

(65) Prior Publication Data
US 2017/0120445 A1 May 4, 2017

Related U.S. Application Data

(63) Continuation of application No. 15/035,627, filed as application No. PCT/SE2013/051330 on Nov. 12, 2013, now Pat. No. 9,573,275.

(51) Int. Cl.
*B25J 9/16* (2006.01)
*A01D 34/00* (2006.01)
*G05D 1/02* (2006.01)

(52) U.S. Cl.
CPC .......... *B25J 9/1643* (2013.01); *A01D 34/008* (2013.01); *B25J 9/1664* (2013.01);
(Continued)

(58) Field of Classification Search
CPC ................... B25J 9/1643; B25J 9/1664; B25J 13/088–089; G05B 19/19; G05B 19/406;
(Continued)

(56) References Cited

U.S. PATENT DOCUMENTS

| 4,484,287 A | 11/1984 | Gamo et al. |
| 5,075,870 A | 12/1991 | Kojyo et al. |

(Continued)

FOREIGN PATENT DOCUMENTS

| CN | 102183260 B | 10/2012 |
| DE | 102004013811 A1 | 10/2005 |

(Continued)

OTHER PUBLICATIONS

Guidance Definition of Guidance at Dictionary.com.pdf (https://www.dictionary.com/browse/guidance, Guidance | Definition of Guidance at Dictionary.com, May 29, 2019, pp. 1-4) (Year: 2019).*

(Continued)

*Primary Examiner* — Bao Long T Nguyen
(74) *Attorney, Agent, or Firm* — Burr & Forman LLP

(57) ABSTRACT

A robotic work tool system, comprising a robotic work tool, said robotic work tool comprising a controller being configured to cause said robotic work tool to operate in a first operating mode, which first operating mode is based on a current position, said current position being determined based on signals received from a position determining device, such as Global Navigation Satellite System device; determine that said received signals are not reliable, and in response thereto cause said robotic work tool to operate according to second operating mode, which second operating mode is not based on a current position being determined based on said received signals.

16 Claims, 3 Drawing Sheets

(52) U.S. Cl.
CPC ......... *G05D 1/0219* (2013.01); *G05D 1/0265* (2013.01); *G05D 1/0274* (2013.01); *G05D 1/0278* (2013.01); *G05D 2201/0208* (2013.01); *Y10S 901/01* (2013.01); *Y10S 901/09* (2013.01)

(58) Field of Classification Search
CPC ............... G05B 19/4067; G05B 23/02; G05B 2219/40224; G05B 2219/40204; Y10S 901/09; Y10S 901/01; G05D 1/02; G05D 1/0219; G05D 1/0265; G05D 1/0274; G05D 1/0278; G05D 2201/0208; G01C 21/12; A01D 34/00; A01D 34/008
USPC ............. 700/253, 250; 901/1, 9; 318/568.24
See application file for complete search history.

(56) References Cited

U.S. PATENT DOCUMENTS

| | | | |
|---|---|---|---|
| 5,610,489 A | 3/1997 | Hart et al. | |
| 5,944,132 A * | 8/1999 | Davies | A63B 24/0021 180/168 |
| 6,611,738 B2 | 8/2003 | Ruffner | |
| 7,953,526 B2 | 5/2011 | Durkos et al. | |
| 9,243,918 B2 * | 1/2016 | Goldman | G01C 21/12 |
| 9,573,275 B2 * | 2/2017 | Reigo | A01D 34/008 |
| 10,136,576 B2 * | 11/2018 | Reigo | A01D 34/008 |
| 2004/0221790 A1 | 11/2004 | Sinclair et al. | |
| 2005/0038578 A1 * | 2/2005 | McMurtry | A01B 79/005 701/25 |
| 2008/0039991 A1 | 2/2008 | May et al. | |
| 2009/0030551 A1 | 1/2009 | Hein et al. | |
| 2009/0281661 A1 * | 11/2009 | Dooley | B60L 50/66 700/258 |
| 2010/0057251 A1 | 3/2010 | Ikushima | |
| 2011/0125358 A1 | 5/2011 | Biber et al. | |
| 2011/0190931 A1 * | 8/2011 | Anderson | G05D 1/0276 700/253 |
| 2011/0202175 A1 * | 8/2011 | Romanov | A47L 11/4011 700/250 |
| 2013/0218397 A1 | 8/2013 | Griffini et al. | |

FOREIGN PATENT DOCUMENTS

| | | |
|---|---|---|
| DE | 202012006267 U1 | 10/2012 |
| EP | 1078307 A1 | 2/2001 |
| EP | 2269433 A1 | 1/2011 |
| GB | 2277152 A | 10/1994 |
| WO | 02/101477 A2 | 12/2002 |
| WO | 2009106435 A1 | 9/2009 |
| WO | 2011115534 A1 | 9/2011 |

OTHER PUBLICATIONS

Navigate _ Definition of Navigate by Merriam-Webster.pdf (https://www.merriam-webster.com/dictionary/navigate, Navigate | Definition of Navigate by Merriam-Webster, May 28, 2019, pp. 1-12) (Year: 2019).*
International Search Report and Written Opinion in International patent application No. PCT/SE2013/051330 dated Aug. 13, 2014.
International Preliminary Report on Patentability for International patent application No. PCT/SE2013/051330 dated May 17, 2016.
Cao, F.X., et al., "Low Cost SINS/GPS Integration for Land Vehicle Navigation," The IEEE 5th International Conferent on Intelligent Transportation Systems, Sep. 6, 2002.
Garcia-Alegre, M.C., et al., ""Autonomous Robot in Agriculture Tasks,"" Instituto de Automática Industrial (IAI), pp. 7.
Martin, Michael K., et al., "Benefits of Low-Cost INS/GPS to Augment Land Navigation," Proceedings of the 12th International Technical Meeting of the Satellite Division of The Institute of Navigation (ION GPS 1999), pp. 1121-1132 (Sep. 14-17, 1999).
North, Eric, et al., "Improved Inertial/Odometry/GPS Positioning of Wheeled Robots Even in GPS-Denied Environments," Global Navigation Satellite Systems—Signal, Theory and Applications, pp. 257-278 (Feb. 3, 2012).
Zhan, et al., "LOBOT: Low-Cost, Self-Contained Localization of Small-Sized Ground Robotic Vehicles,"IEEE Transactions on Parallel and Distributed Systems, vol. 24, Issue: 4, pp. 744-753, (Apr. 2013).
Wang, J., et al., "Mobile robot GPS/DR integrated navigation positioning technique research," Proceedings of SPIE—International Society for Optical Engineering, vol. 7500, p. 75000T (Dec. 3, 2009).

* cited by examiner

NAVIGATION FOR A ROBOTIC WORKING TOOL

CROSS REFERENCE TO RELATED APPLICATIONS

This application is a continuation of U.S. application Ser. No. 15/035,627 filed May 10, 2016, which is a national phase entry of PCT/SE2013/051330 filed Nov. 12, 2013, the entire contents of which are hereby incorporated by reference.

TECHNICAL FIELD

This application relates to a method and a robotic work tool system for an improved navigation for a robotic work tool.

BACKGROUND

Contemporary robotic work tools are becoming more and more advanced and are able to perform more and more advanced tasks such as executing advanced operation patterns.

In the example of lawnmower robots the advanced working pattern may be a complicated mowing pattern based on the layout of a garden including bushes, garden islands and other structures. To successfully navigate such complicated areas some contemporary robotic work tools employ satellite navigation.

A satellite navigation or sat nav system is a system of satellites that provide autonomous geo-spatial positioning with global coverage. It allows small electronic receivers to determine their location (longitude, latitude, and altitude) to within a few metres, or even centimetres, using signals transmitted along a line-of-sight by radio from satellites. Receivers calculate the precise time as well as position and carrier phase, which can be used as a reference for scientific experiments. A satellite navigation system with global coverage may be termed a global navigation satellite system or GNSS (Global Navigation Satellite System).

The use of GNSS systems requires good reception of satellite signals to work reliably. The satellite signals may sometimes be blocked by buildings, roofs, awnings, foliage or trees. To improve the accuracy of GNSS systems a reference receiver, or beacon, within a short distance from the target receiver can be used. This is called differential GNSS. There are several DGNSS techniques, such as the classical DGNSS (or DGPS), the Real Time Kinematics (RTK) and the Wide Area RTK (WARTK).

However, the signal from a beacon may also be blocked by for example a house if the garden or other work area extends around the building.

If the robotic work tool is unable to correctly receive the signals from the position determining system, the robotic work tool will be challenged to correctly navigate the work area and a satisfactory coverage of the work area may not be achieved by the robotic work tool.

It should be noted that similar problems exist also for other position determining devices, such as using optical beacons where the line of sight may be blocked in certain areas.

Even though the problems above have been discussed for lawnmower robotic work tools, the same or similar problems exist also for other robotic work tools.

There is thus a need for a manner of enabling reliable operation of a robotic work tool even in situations where the robotic work tool may not be able to receive reliable signals.

SUMMARY

It is an object of the teachings of this application to overcome the problems listed above by providing a robotic work tool system, comprising a robotic work tool, said robotic work tool comprising a controller being configured to cause said robotic work tool to operate in a first operating mode, which first operating mode is based on a current position, said current position being determined based on signals received from a position determining device, such as Global Navigation Satellite System device; determine that said received signals are not reliable, and in response thereto cause said robotic work tool to operate according to second operating mode, which second operating mode is not based on a current position being determined based on said received signals.

The robotic work tool (100) is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

It is also an object of the teachings of this application to overcome the problems listed above by providing a method for use in a robotic work tool system, comprising a charging station and a robotic work tool, said method comprising: causing said robotic work tool to operate in a first operating mode, which first operating mode is based on a current position, said current position being determined based on signals received from a position determining device, such as Global Navigation Satellite System device; determining that said received signals are not reliable, and in response thereto causing said robotic work tool to operate according to second operating mode, which second operating mode is not based on a current position being determined based on said received signals.

The inventors of the present invention have realized, after inventive and insightful reasoning that by enabling the robotic work tool to switch from a GNSS navigation operation mode to a second or alternative navigation mode, for example deduced reckoning or other, perhaps more random operating pattern, the robotic work tool will be able to perform satisfactory without unneeded stops even in areas where GNSS navigation is not reliable while still being able to perform a complicated operating pattern. As signals may be reliably received in most situations only smaller sections of a work area will be (herein referred to as) a blackout section. Should the robotic work tool not follow a complicated operating pattern exactly in those smaller sections, a satisfactory over all operation will still be achieved.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
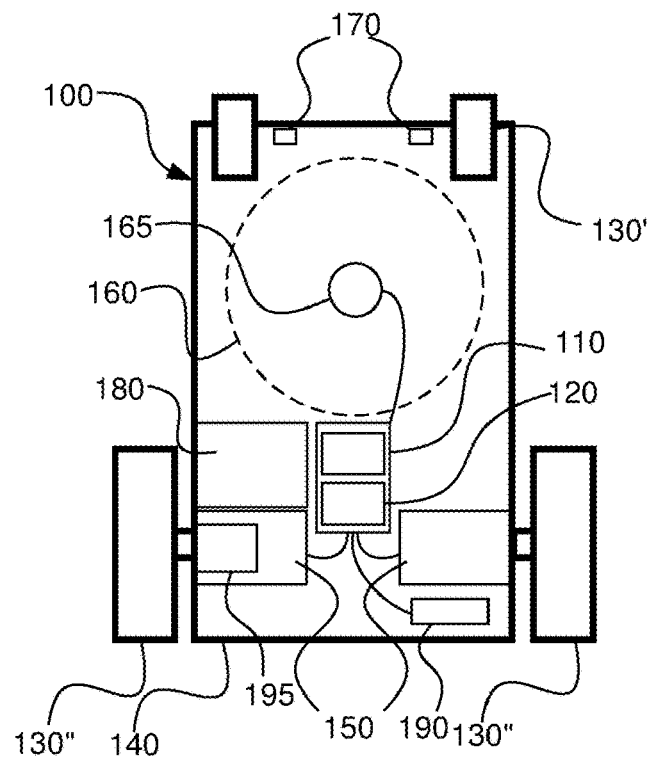
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further has at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool that is configured to operate in a work area, where the work area is not bounded by a boundary wire. Examples of such robotic work tools are tools arranged to physically detect a boundary by collision detection, or a robotic work tool that uses a position determination system (such as GPS) to maintain a position within the work area, which work area is specified by coordinates.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool equipment.

The robotic work tool 100 may also be a vacuum cleaner, a floor cleaner, a street sweeper, a snow removal tool, a mine sweeper or any other robotic work tool that is required to operate in a work area in a methodical and systematic manner.

The robotic work tool 100 also has (at least) one battery 180 for providing power to the motors 150 and the cutter motor 165. Alternatively or additionally the robotic work tool may have a fuel tank 180 for supplying fuel to a combustion engine 150.

The robotic work tool 100 is also arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device 190 and to control the movements of the robotic work tool 100 based on the position.

Other examples of position determining devices 190 include optical (such as laser) position determining devices, other radio frequency position determining systems, and ultrawideband (UWB) beacons and receivers.

The robotic work tool 100 is further arranged with at least one sensor 195 for providing signals for deduced reckoning navigation (also known as dead reckoning). Examples of such deduced reckoning navigation sensors 195 are odometers, accelerometers, gyroscopes and compasses. The robotic work tool 100 may alternatively or additionally be arranged with sensors for other navigation techniques such as visual/optical navigation systems, SLAM (Simultaneous Location And Mapping) and fingerprint fusion to name a few.

Figure 2:
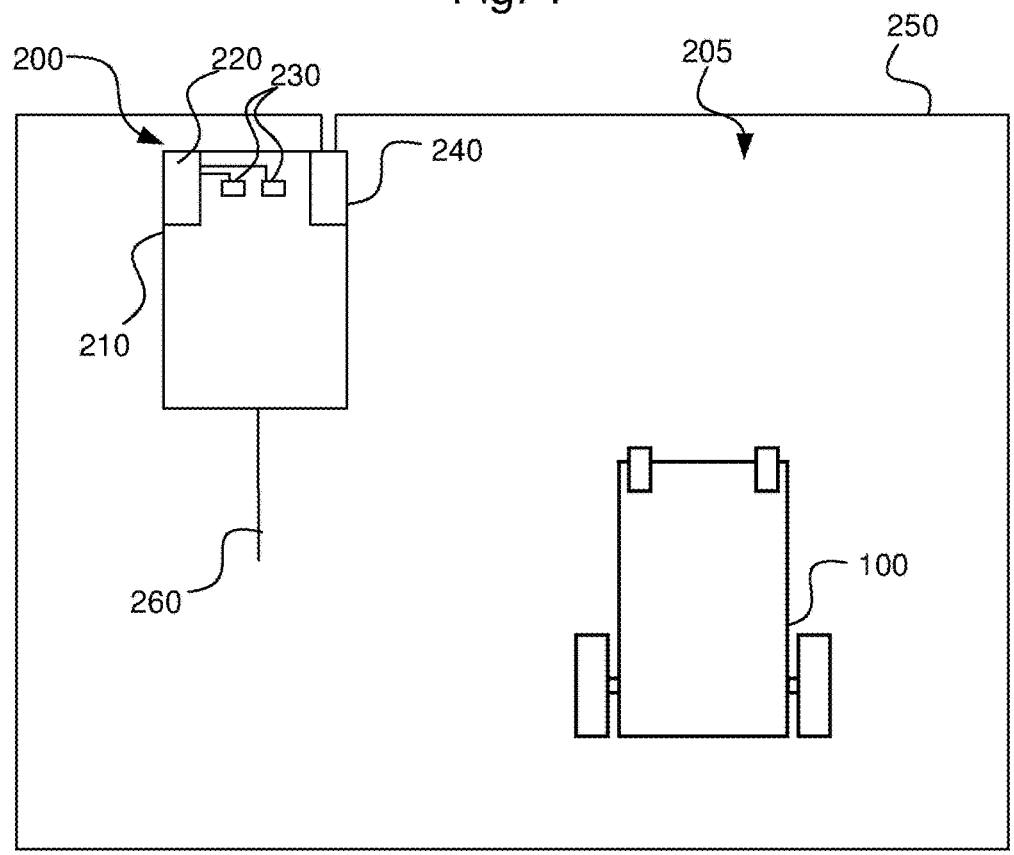
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, not necessarily being a part of the robotic work tool system 200, in which the robotic work tool 100 is supposed to service. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

Figure 3A:
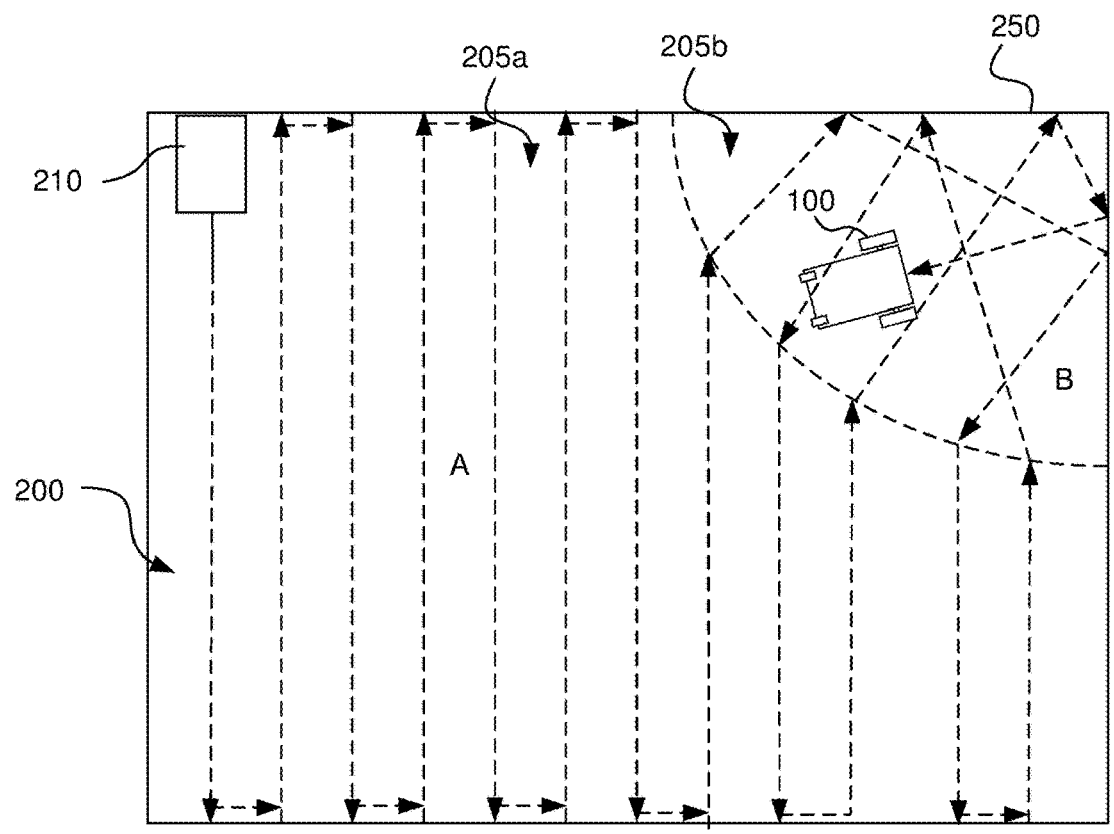
FIGS. 3A and 3B each shows a schematic view of a robotic working tool system according to one embodiment of the teachings of this application.

FIG. 3A shows another schematic view of a robotic work tool system 200 according to the teachings herein, such as the robotic work tool system 200 of FIG. 2, being depicted here at a larger scale.

A boundary wire 250 encloses a working area 205 in which the robotic work tool 100 is configured to operate within. The working area 205 has a first section 205a in which GNSS navigation is possible and a second section 205b in which GNSS navigation is not possible. The first section 205 will hereafter be referred to as a GNSS section 205a and the second section 205b will be referred to as a blackout section 205b. The reason why GNSS navigation is not possible in the blackout section 205b may be due to buildings, roofs, awnings, trees or other foliage blocking the satellite signals or making the satellite signals unreliable. It should be noted that the teachings herein may also be used for a robotic work tool that is configured to operate in a work area, where the work area is not bounded by a boundary wire. Examples of such robotic work tools are tools arranged to physically detect a boundary by collision detection, or a robotic work tool that uses a position determination system (such as GNSS) to maintain a position within the work area, which work area is specified by coordinates.

The robotic work tool 100 is configured to utilize its GNSS device 190 to control its working operation. In the example of the robotic work tool 100 being a lawnmower robot, the controller 110 determines a mowing pattern based on a position of the robotic work tool 100.

The mowing pattern may be determined as a heading to be taken or a circular pattern or other mowing pattern. The mowing pattern may also be based on a map of the work area 250. Such mowing patterns are known to a skilled person and will not be discussed further herein.

In the example of FIG. 3A the robotic work tool 100 is configured to operate in a first operating mode or manner based on a position retrieved from the GNSS device 190 as long as the GNSS device 190 is able to receive reliable signals from position determining device, such as either satellites or one or more beacons or a RTK-GPS master station. The controller 110 or the GNSS device 190 itself is configured to determine that the signals received are reliable and in response thereto execute a working pattern.

When the robotic work tool 100 is not able to receive reliable satellite signals, the controller 110 is configured to continue operation in a second operating mode using an alternative navigation system or to determine an alternative mowing pattern that does not require (advanced or absolute) position determining.

In one embodiment the controller is configured to continue operation in a random operating pattern where no exact navigation is required as long as the GNSS device 190 is unable to receive reliable signals. Alternatively or additionally, the robotic work tool may be configured to continue in a simple operating pattern (such as expanding circle or other well known operating pattern), possibly in combination with a random operating pattern. Such patterns and combinations thereof are well-known in the field of robotic work tools.

It should be noted that when discussing the ability of receiving reliable signals it is meant to receive enough signals to establish a position reliably. The number of signals needed for this differs from GNSS device 190 to GNSS device as well as the operation and safety issues of the robotic work tool 100. For example, if only the position is of interest it suffices to receive three reliable signals to establish a reliable position, whereas if, for example, the amplitude or time is also of relevance, a fourth signal need be reliably received.

In the example of FIG. 3A the robotic work tool 100 has performed a regular mowing pattern (referenced A) as indicated by the horizontal and vertical dashed arrowed lines in the GNSS seciton 205a. As the robotic work tool 100 enters the blackout section 205b where the robotic work tool 100 is no longer able to establish a position reliably, the robotic work tool 100 switches operating mode from GNSS navigated operation to, as in this example, random mowing. As can be seen in FIG. 3A a random mowing pattern B is executed as long as it is not possible to establish a position reliably. As the robotic work tool 100 re-enters the GNSS section 205a of the work, the robotic work tool 100 again switches back to GNSS navigated operation and continues the determined mowing pattern. In one embodiment a new, position—based operating pattern may be determined to account for large position displacements.

In one embodiment the controller is configured to store a map of the work area in the memory. The map may alternatively be over the blackout area. The robotic work tool may adapt its operation based on a current position in the work area based on the map. One such adaptation is that the robotic work tool may proactively initiate the second operating mode as it determines that it is close to or about to enter the blackout area.

In one such embodiment the controller may be configured to generate such a map of the blackout area as it detects that signals are no longer reliably received. Also, the controller may be configured to update the map each time it leaves or enters the blackout area. Especially if it is detected that the navigation error previously determined is not negligible.

The robotic work tool may also adapt its working pattern according to the map to provide a more efficient operation.

By switching modes, the robotic work tool 100 is able to provide a satisfactory operation also in areas where GNSS-based navigation is not possible.

Figure 3B:
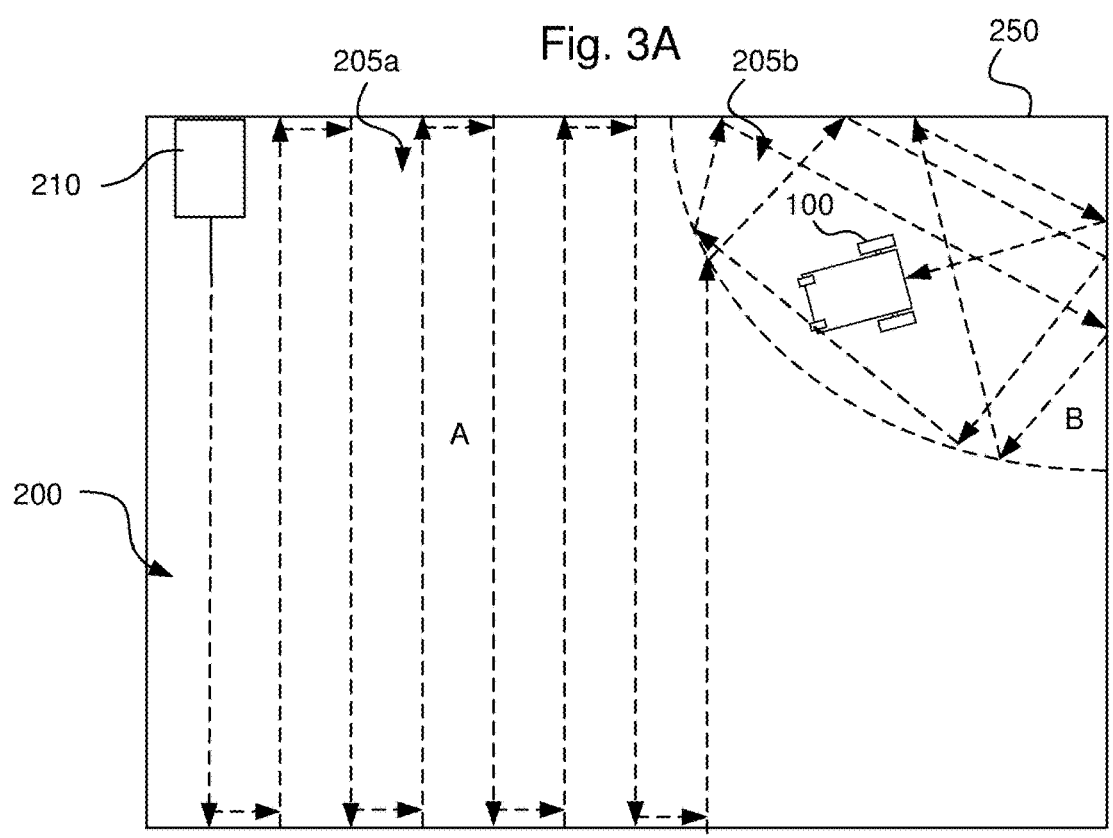

FIG. 3B an alternative embodiment of the teachings herein, wherein the robotic work tool 100 is configured to detect that the robotic work tool 100 enters the GNSS section 205a, i.e. the robotic work tool 100 is able to receive reliable signals, and then turning back into the blackout section 205b again to ensure a sufficient operating time within the blackout section 205b. The robotic work tool 100 may be configured to determine if it is to turn back into the blackout section 205 or if it is to continue out in the GNSS section 205a based on a time spent in the blackout section 205b, number of turns made in the blackout section 205b, and/or the number of times it has been possible to re-enter the GNSS section 205a. The number of times it has been able to return into the GNSS section 205a and/or the number of turns it has made may be kept track of by increasing a counter which is then compared to a threshold value. If the counter exceeds the threshold value the robotic work tool 100 is caused to re-enter the GNSS section 205a.

For example, the robotic work tool 100 may be configured to re-enter the GNSS section 205a on the 4$^{th}$ time it is able to determine a reliable position. Another example is that the robotic work tool 100 is configured to re-enter the GNSS section 205a after it has performed at least 10 turns in the blackout section 205b. Yet another example is that the robotic work tool 100 is configured to re-enter the GNSS section 205a after it has spent at least 10 minutes in the blackout section 205b. Another example is that the robotic work tool 100 is configured to reenter the GNSS section 205a after it has traveled at least 10 meters in the blackout section 205b.

The distance traveled may be measured using the deduced reckoning sensors or by simply counting a number of wheel turns or a combination thereof.

This ensures that at least a minimum of work is performed in the blackout section 205b and provides for a more complete coverage of the blackout section 205b.

Furthermore, the controller 110 may be configured to determine an area of the blackout area and also the work area and to determine whether enough time has been spent operating in the work area. The area can be determined by tracking a position over a time period and thereby calculating the traversed area.

Figure 4:
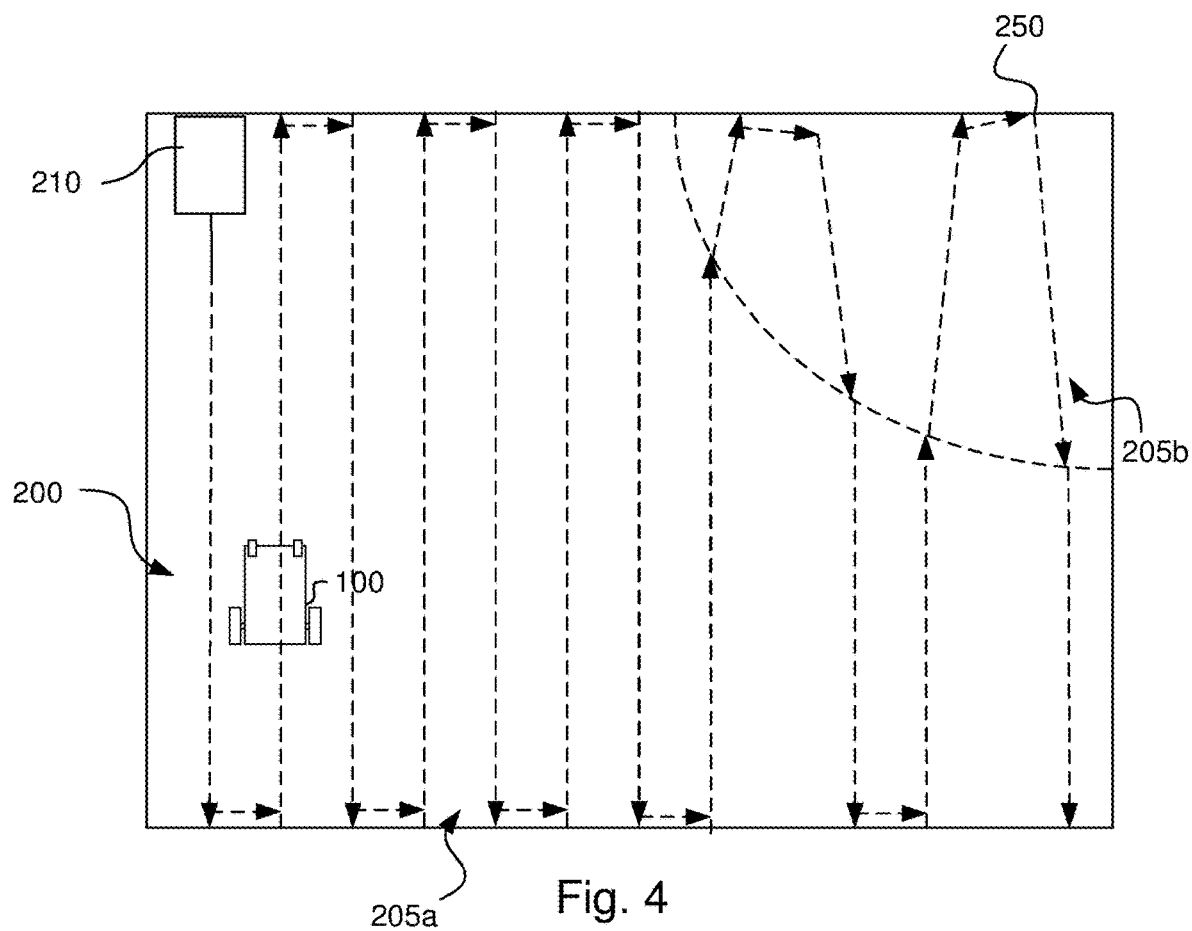
FIG. 4 shows a schematic view of a robotic working tool system according to one embodiment of the teachings of this application.

FIG. 4 shows a schematic view of a robotic work tool system 200 wherein the robotic work tool 100 is arranged to operate according to an alternative embodiment of the teachings herein, in which the robotic work tool 100 is configured to switch to an alternative navigation mode when it determines that a reliable position may no longer be established. One such alternative navigation mode is deduced reckoning. Deduced reckoning works so that the last known direction is taken to be the current and assumed direction and by for example measuring the number of wheel turns (or rather turn speed of the wheel axel and the time) the current position is determined. As the robotic work tool 100 encounters the boundary wire 250 it turns and by counting the number of wheel turns the new direction can be determined and the controller 110 may control the operation of the robotic work tool 100 based on the position determined based on the deduced reckoning. An odometer 195 may also be used to determine the current position or turning angle in the deduced reckoning navigation mode.

As can be seen in FIG. 4 the resulting operating pattern B (in this example the mowing pattern) does not differ much from the GNSS based operating pattern A, and a satisfactory mowing pattern may be achieved even if the robotic work tool 100 is not always able to establish a reliable position.

In one embodiment, the robotic work tool 100 is further configured to correct its position and/or direction according to an expected position. The expected position is where the robotic work tool (100) should have been if it had continued operating according to the first GNSS operating mode. The correction may be that the robotic work tool 100 steers towards and possibly along an expected movement line, i.e. a line that the robotic work tool is expected or planned to move along, in the mowing pattern or returns to the expected position. This enables the robotic work tool 100 to minimize the effects of any errors induced by the deduced reckoning navigation sensor 195 during the deduced reckoning navigation.

One benefit of the teachings herein is that a robotic work tool is enabled to provide a satisfactory mowing pattern even if the robotic work tool 100 is not able to establish a reliable position using the GNSS device 190.

It should be noted that even though the mowing pattern shown in the exemplifying figures are very simple, the teachings herein may be beneficially used to provide advanced mowing patterns taking into account obstacles or other (garden) architectural features. The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A robotic lawnmower system comprising a robotic lawnmower, said robotic lawnmower comprising a controller being configured to:
   cause the robotic lawnmower to navigate a work area to execute a mowing pattern on the work area in a first operating mode, wherein the first operating mode is based on a current position, said current position being determined based on received signals that are received from a Global Navigation Satellite System device;
   determine that said received signals are not reliable, and in response thereto cause said robotic lawnmower to navigate the work area according to a second operating mode, wherein the second operating mode is not based on a current position being determined based on said received signals;
   determine that said received signals are reliable again, and in response thereto switch to said first operating mode; and
   determine if a counter is lower than a threshold value when said received signals are reliable again and if so, cause said robotic lawnmower to execute a turn to re-enter a section where said signals are not reliably received and increase said counter.

2. The robotic lawnmower system according to claim 1, wherein the controller is further configured to determine an expected position and cause said robotic lawnmower to steer towards said expected position.

3. The robotic lawnmower system according to claim 1, wherein the controller is further configured to determine an expected movement line and cause said robotic lawnmower to steer towards said expected movement line.

4. The robotic lawnmower system according to claim 1, wherein the second operating mode is a random mowing pattern.

5. The robotic lawnmower system according to claim 1, wherein the second operating mode is an expanding circle mowing pattern.

6. The robotic lawnmower system according to claim 1, wherein the second operating mode is based on a deduced reckoning mowing pattern.

7. The robotic lawnmower system according to claim 1, wherein the controller is configured to determine that said robotic lawnmower encounters a boundary wire and in response thereto increase said counter.

8. The robotic lawnmower system according to claim 1, wherein the controller is configured to determine that said robotic lawnmower executes a turn and in response thereto increase said counter.

9. The robotic lawnmower system according to claim 1, wherein the controller is further configured to start a timer as said signals are determined not to be reliable; and
   determine if the timer is lower than a threshold value when said received signals are reliable again and if so, cause said robotic lawnmower to execute a turn to re-enter a section where said signals are not reliably received.

10. The robotic lawnmower system according to claim 1, wherein the controller is configured to store a map and to adapt operation of the robotic lawnmower based on a current position in the work area based on the map.

11. The robotic lawnmower system according to claim 10, wherein the controller is configured to adapt the operation of the robotic lawnmower by initiating said second operating mode when the controller determines that the robotic lawnmower is close to or about to enter a blackout area.

12. The robotic lawnmower system according to claim 10, wherein the controller is configured to update the map each time the robotic lawnmower leaves or enters a blackout area.

13. The robotic lawnmower system according to claim 1, wherein causing the robotic lawnmower to navigate the work area comprises causing the robotic lawnmower to autonomously execute the mowing pattern.

14. A robotic lawnmower system comprising a robotic lawnmower, said robotic lawnmower comprising a controller being configured to:
   cause the robotic lawnmower to navigate a work area to execute a mowing pattern on the work area in a first operating mode, wherein the first operating mode is based on a current position, said current position being determined based on received signals that are received from a Global Navigation Satellite System device;
   determine that said received signals are not reliable, and in response thereto cause said robotic lawnmower to navigate the work area according to a second operating mode, wherein the second operating mode is not based on a current position being determined based on said received signals;
   measure a distance traveled as said signals are determined not to be reliable;
   determine that said received signals are reliable again, and in response thereto switch to said first operating mode; and
   determine if the distance traveled is lower than a threshold value when said received signals are reliable again and if so, cause said robotic lawnmower to execute a turn to re-enter a section where said signals are not reliably received.

15. A method for use in a robotic lawnmower system comprising a robotic lawnmower, said method comprising:
   causing said robotic lawnmower to navigate a work area to execute a mowing pattern on the work area in a first operating mode, which first operating mode is based on a current position, said current position being determined based on signals received from a Global Navigation Satellite System device;
   determining that said received signals are not reliable, and in response thereto causing said robotic lawnmower to navigate the work area according to second operating mode, which second operating mode is not based on a current position being determined based on said received signal;
   storing a map and adapting operation of the robotic lawnmower based on a current position in the work area based on the map; and
   updating the map each time the robotic lawnmower leaves or enters a blackout area.

16. The method of claim 15, wherein causing the robotic lawnmower to navigate the work area comprises causing the robotic lawnmower to autonomously execute the mowing pattern.

* * * * *